United States Patent
Grosse-Willerich et al.

(10) Patent No.: US 10,752,731 B2
(45) Date of Patent: Aug. 25, 2020

(54) PROCESS FOR THE CONTINUOUS PRODUCTION OF POLYETHER POLYOLS

(71) Applicant: BASF SE, Ludwigshafen (DE)

(72) Inventors: Julia Grosse-Willerich, Limburgerhof (DE); Kerstin Wiss, Mannheim (DE); Karl-Heinz Wassmer, Mutterstadt (DE); Peter Deglmann, Mannheim (DE); Christian Buss, Dresden (DE); Vinit Chilekar, Ludwigshafen (DE)

(73) Assignees: BASF SE, Ludwigshafen (DE); BASF Schwarzheide GmbH, Schwarzheide (DE)

( * ) Notice: Subject to any disclaimer, the term of this patent is extended or adjusted under 35 U.S.C. 154(b) by 0 days.

(21) Appl. No.: 15/302,876

(22) PCT Filed: Apr. 1, 2015

(86) PCT No.: PCT/EP2015/057234
§ 371 (c)(1),
(2) Date: Oct. 7, 2016

(87) PCT Pub. No.: WO2015/155098
PCT Pub. Date: Oct. 15, 2015

(65) Prior Publication Data
US 2017/0037183 A1    Feb. 9, 2017

(30) Foreign Application Priority Data
Apr. 9, 2014 (EP) .................................. 14164026

(51) Int. Cl.
*C08G 65/26* (2006.01)
*B01J 19/18* (2006.01)
(Continued)

(52) U.S. Cl.
CPC ...... *C08G 65/2696* (2013.01); *B01J 19/1862* (2013.01); *C08G 18/08* (2013.01);
(Continued)

(58) Field of Classification Search
CPC ............ C08G 65/2627; C08G 65/2609; C08G 65/2642; C08G 65/2696; C08G 65/2672; C08G 18/4879; C08G 18/4833
See application file for complete search history.

(56) References Cited

U.S. PATENT DOCUMENTS 4,562,290 A    12/1985 Korczak et al.
5,030,758 A    7/1991 Dietrich et al.
(Continued)

FOREIGN PATENT DOCUMENTS

CN    101397360 A    4/2009
WO    WO 2009/077517 A1    6/2009
(Continued)

OTHER PUBLICATIONS

International Search Report dated Jun. 5, 2015 in PCT/EP2015/057234.
(Continued)

*Primary Examiner* — Michael L Leonard
(74) *Attorney, Agent, or Firm* — Oblon, McClelland, Maier & Neustadt, L.L.P.

(57) ABSTRACT

This invention relates to a process for the continuous production of polyether polyols, polyether polyols produced by the inventive continuous process and their use in polyurethane applications.

2 Claims, 3 Drawing Sheets

(51) Int. Cl.
*C08G 18/08* (2006.01)
*C08G 18/48* (2006.01)
*C08G 18/72* (2006.01)
*C08J 9/00* (2006.01)
*C08G 101/00* (2006.01)

(52) U.S. Cl.
CPC ......... *C08G 18/4833* (2013.01); *C08G 18/72* (2013.01); *C08G 65/2609* (2013.01); *C08G 65/2627* (2013.01); *C08G 65/2642* (2013.01); *C08G 65/2672* (2013.01); *C08J 9/00* (2013.01); *C08G 2101/00* (2013.01); *C08G 2101/0025* (2013.01); *C08J 2205/10* (2013.01); *C08J 2375/08* (2013.01)

(56) References Cited

U.S. PATENT DOCUMENTS

| | | | |
|---|---|---|---|
| 5,364,973 A * | 11/1994 | Pazos | C08G 18/4866 564/475 |
| 5,895,824 A * | 4/1999 | Dinsch | C08G 18/5033 252/182.24 |
| 6,410,801 B1 | 6/2002 | Hinz et al. | |
| 2002/0147370 A1 | 10/2002 | Hinz et al. | |
| 2011/0263742 A1 * | 10/2011 | Zarbakhsh | C07C 213/04 521/167 |
| 2013/0261206 A1 * | 10/2013 | Chilekar | B01J 27/24 521/174 |

FOREIGN PATENT DOCUMENTS

WO  WO 2013/014153 A1  1/2013
WO  WO 2013/149860 A1  10/2013

OTHER PUBLICATIONS

International Preliminary Report on Patentability and Written Opinion dated Oct. 12, 2016 in PCT/EP2015/057234.

\* cited by examiner

PROCESS FOR THE CONTINUOUS PRODUCTION OF POLYETHER POLYOLS

This invention relates to a process for the continuous production of polyether polyols, polyether polyols produced by the inventive continuous process and their use in polyurethane applications.

Vicinal toluene diamine (TDA, also referred to as tolylene diamine or toluylene diamine) initiated Polyetherpolyols are mostly used in rigid Polyurethane foam applications. These Polyetherols could also be produced using a co-starter along with TDA such as any H-functional starter (alcohols e.g. diols, glycerine, amines or water). The production of these Polyols is conventionally done in a semi-batch process. A new process concept is developed to produce them in the continuous process using the potential of amine catalyst.

In WO2009/077517 A1, a continuous process for the production of polyether alcohols was described, based on the amine catalysis, mainly based on DMEOA catalyst. It has been observed that DMEOA catalyst shows thermal degradation with time leading to deactivation of catalyst in the reactor. The catalyst deactivation leads to process problems such as unusual long batch times i.e larger residence times in continuous reactors and incomplete conversion of alkylene oxide in the product. Operation at lower temperature increases viscosity of the product and also leads to lower production rates. It was required to find a catalyst which maintains high activity at the reaction temperatures in order to improve the process operation and minimize the equipment size, mainly reducing investment.

In WO 2013/014153 a process using Imidazole is described with much better performance. But in case of TDA starter, if TDA and the amine catalyst are charged continuously to the first reactor, there is no complete conversion of the starter. The high residual amount of TDA is undesirable, so the continuous process needs to be modified for TDA.

US 2011/0263742 A1 discloses a process for producing polyether polyols by reacting aromatic amines with alkylene oxides comprising mainly propylene oxide, wherein an amine is used as catalyst. The resulting polyols are supposedly almost free of residual TDA; however, the process described in this document is not a continuous procedure.

U.S. Pat. No. 6,410,801 B1 discloses a continuous process for the production of polyether polyols. The preferred catalyst which is used in all of the examples is KOH, thus making a work-up of the product inevitable. The document does not describe an arrangement comprising at least one plug-flow reactor and/or a cascade of at least two continuously stirred tank reactors.

WO 2013/149860 describes a continuous process for the production of polyetherols by catalyzed addition of at least one alkylene oxide to at least one hydrogen-functional starter compound, wherein at least one catalyst exhibits the structural element R1/R2C=N—R3. The publication focusses on hydrogen-functional starters which are solid at room temperature, in particular sugars like sucrose, rather than on amine-functional starter compounds; the preferred catalysts do not include imidazoles. The disclosed process is a single-stage process, wherein the added catalyst is present from the beginning. In the experimental examples, only one CSTR is used.

Surprisingly it was found that using a PFR or a cascade of stirred tank reactors with at least 2, preferably at least 3 reactors for an autocatalytic reaction of aromatic amines, like TDA, with one or more alkylene oxides dosed at one or more points in the process as a first reaction step and finally adding catalyst and one or more alkylene oxides in a second reactor step could reduce the residual content of aromatic amines, like TDA, in the final product significantly. Thus values below 1000 ppm residual TDA were reached.

Thus, the object of the present invention is a process for the continuous production of polyether alcohols, wherein (a) at least one aromatic amine (AA) is continuously added at one dosing point D1 to an arrangement R1 comprising at least one plug-flow reactor (PFR) and/or a cascade of at least two, preferably at least three continuously stirred tank reactors (CSTRs), and reacted with at least one alkylene oxide 1 (AO1) which is continuously dosed into the arrangement R1 at one or more dosing points D2 to generate intermediate (I), and subsequently (b) intermediate (I) is continuously transferred, preferably by means of a pump, into another arrangement R2 comprising at least one further reactor, and reacted with at least one alkylene oxide 2 (AO2) in the presence of at least one amine compound (AC), which is preferably added continuously.

Further objects of the present invention are a polyether polyol, obtainable by the inventive process, and a process for the production of a polyurethane, wherein at least one polyether alcohol, obtainable by the inventive process, is reacted with at least one di- or polyisocyanate, optionally in the presence of a blowing agent.

In one embodiment of the inventive process, the arrangement R1 in step (a) consists of a cascade of two continuously stirred tank reactors (CSTRs).

In another embodiment of the inventive process, the arrangement R1 in step (a) consists of a cascade of three CSTRs; in a further embodiment of the inventive process, the arrangement R1 in step (a) consists of a cascade of four CSTRs.

In another embodiment of the inventive process, the arrangement R1 in step (a) comprises a cascade of at least five CSTRs.

In one embodiment of the inventive process, the arrangement R1 in step (a) consists of one plug-flow reactor (PFR). In another embodiment of the inventive process, the arrangement R1 in step (a) consists of two PFRs; in a further embodiment of the inventive process, the arrangement R1 in step (a) consists of three PFRs.

In another embodiment of the inventive process, the arrangement R1 in step (a) comprises at least four PFRs.

In one embodiment of the inventive process, the arrangement R1 in step (a) consists of one plug-flow reactor (PFR) and one continuously stirred tank reactor (CSTR).

In another embodiment of the inventive process, the arrangement R1 in step (a) consists of one PFR and a cascade of two continuously stirred tank reactors (CSTRs); in a further embodiment of the inventive process, the arrangement R1 in step (a) consists of one PFR and a cascade of three continuously stirred tank reactors (CSTRs).

In one embodiment of the inventive process, the arrangement R1 in step (a) consists of two plug-flow reactors (PFRs) and one continuously stirred tank reactor (CSTR).

In another embodiment of the inventive process, the arrangement R1 in step (a) consists of two plug-flow reactors (PFRs) and a cascade of two continuously stirred tank reactors (CSTRs); in a further embodiment of the inventive process, the arrangement R1 in step (a) consists of two PFRs and a cascade of three continuously stirred tank reactors (CSTRs).

As aromatic amines (AA), it is in principle possible to use all known aromatic amines having at least one, preferably at least two and particularly preferably two amino group(s). The amino groups are usually primary amino groups.

In a preferred embodiment of the process of the invention, the aromatic amines are selected from the group consisting of aniline, TDA, MDA and p-MDA, particularly preferably from the group consisting of TDA and p-MDA. In particular, TDA is used.

When TDA is used, it is possible to use all isomers, either alone or in any mixtures with one another. In particular, it is possible to use 2,4-TDA, 2,6-TDA, mixtures of 2,4-TDA and 2,6-TDA, 2,3-TDA, 3,4-TDA, mixtures of 3,4-TDA and 2,3-TDA, and also mixtures of all isomers mentioned.

2,3-TDA and 3,4-TDA are frequently also referred to as ortho-TDA or vicinal TDA (vic-TDA, also called vTDA). The two terms are used synonymously. The TDA can be exclusively vicinal TDA. In a particularly preferred embodiment of the process of the invention, the TDA comprises at least 90% by weight, particularly preferably at least 95% by weight and in particular at least 98% by weight, in each case based on the weight of the TDA, of vicinal TDA.

In a preferred embodiment of the inventive process, the ratio of isomers in the vic-TDA is in the range of 50 to 70% by weight 3,4-TDA and 30 to 50% by weight 2,3-TDA, based on the sum of the weight of both TDA isomers.

In a further embodiment of the invention, the aromatic amines AA can be used in combination with other compounds having at least two hydrogen atoms which are reactive toward isocyanate groups. These compounds are preferably alcohols or amino alcohols having a molecular weight of 40-400 g/mol, in particular 60-120 g/mol, and from 1 to 8, preferably 2 or 3, hydroxyl groups. These compounds will hereinafter also be referred to as costarters.

In one embodiment, at least one at least difunctional alcohol DA is used as costarter.

The at least difunctional alcohols DA are preferably selected from the group consisting of ethylene glycol, diethylene glycol, propylene glycol, dipropylene glycol, glycerol and reaction products thereof with alkylene oxides.

The costarters, like difunctional alcohols DA, are preferably used in an amount of from 0.1 to 20% by weight, preferably from 0.1 to 10% by weight, in particular from 0.1 to 5% by weight, in each case based on the sum of the weights of the components AA, AO1 and DA.

However, it is preferred that no additional difunctional alcohols DA are used as costarters.

As alkylene oxides AO1 and AO2, preference is given to using exclusively propylene oxide. For individual applications, it can be advantageous for a small amount of ethylene oxide to be additionally used. Preferably, the proportion of ethylene oxide should not exceed 10% by weight.

The content of ethylene oxide is, in this embodiment, preferably in the range from >0 to 10% by weight, particularly preferably from >0 to 5% by weight and in particular from >0 to 2% by weight, in each case based on the weight of the alkylene oxides AO1 and AO2.

If ethylene oxide is used, it can be added on as a block or as a mixture with propylene oxide. When it is added on as a block, the addition reaction preferably occurs uncatalyzed at the beginning of the reaction. The addition of mixtures can also be carried out over the entire reaction.

The amine compound AC in step (b) can be a primary, secondary or tertiary amine. Furthermore, aliphatic or aromatic amines can be used. In the case of aliphatic amines, tertiary amines are preferred; however, also primary and/or secondary aliphatic amines may be used. Amines also include amino alcohols. In an embodiment of the process of the invention, the amines can be aromatic heterocyclic compounds having at least one, preferably at least two nitrogen atom(s) in the ring.

The amines used as amine compounds AC are preferably selected from the group consisting of trimethylamine, triethylamine, tripropylamine, tributylamine, N,N'-dimethylethanolamine, N,N'-dimethylcyclohexylamine, dimethylethylamine, dimethylbutylamine, N,N'-dimethylaniline, 4-dimethylaminopyridine, N,N'-dimethylbenzylamine, pyridine, imidazole, N-methylimidazole, 2-methylimidazole, 4-methylimidazole, 5-methylimidazole, 2-ethyl-4-methylimidazole, 2,4dimethylimidazole, 1-hydroxypropylimidazole, 2,4,5-trimethylimidazole, 2-ethylimidazole, 2ethyl-4-methylimidazole, N-phenylimidazole, 2-phenylimidazole, 4-phenylimidazole, guanidine, alkylated guanidines, 1,1,3,3-tetramethylguanidine, 7-methyl-1,5,7-triazabicyclo[4.4.0]dec-5-ene, 1,5-diazabicyclo[4.3.0]-non-5-ene, 1,5-diazabicyclo[5.4.0]undec-7-ene.

The amine compounds AC can be used either alone or in any mixtures with one another.

In one embodiment of the invention, the aliphatic amine compound AC is selected from the group consisting of N,N'-dimethylethanolamine, trimethylamine, triethylamine, dimethylethylamine, N,N'-dimethylcyclohexylamine.

In a preferred embodiment of the invention, at least one, preferably all of the at least one amine compounds AC is/are selected from the group consisting of imidazoles, for example N-methyl imidazole or other alkyl-substituted imidazole derivatives.

More preferably, unsubstituted imidazole is used.

The amine compound AC is preferably used in an amount of 0.1-1.0% by mass based on the total mass of the final product. This amount is particularly preferred when using aliphatic amines.

The heterocyclic amine compounds AC, in particular the imidazoles, are preferably used in an amount of from 0.01 to 0.5% by mass based on the total mass of the final product.

In a preferred embodiment, the amine compound AC is continuously added in step (b).

The polyether alcohols obtainable by the inventive continuous process may be used to produce polyurethanes, in particular rigid foam polyurethanes, by reacting them with at least one di- or polyisocyanate, optionally in the presence of at least one blowing agent.

Typical applications for rigid foam polyurethanes are, inter alia, household appliances, for example insulation for refrigerators, and insulation materials for homes.

Some drawings are added to show certain preferred embodiments of the present invention. In these drawings, "AO" denotes alkylene oxide, AA means "aromatic amine", "I" denotes intermediate product I, and "M" stands for a "motor" (stirrer motor).

Figure 1:
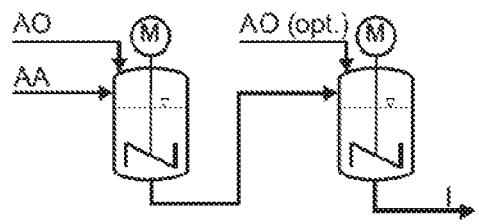
FIG. 1 illustrates certain embodiments of the present invention wherein at least two continuously stirred tank reactors (CSTRs), but no plug-flow reactors (PFRs) are used for step (a) of the process according to claim 1.
Figure 1:
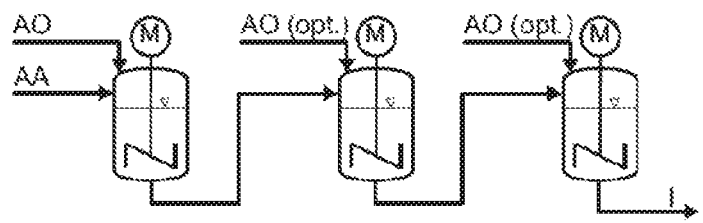
Figure 1:
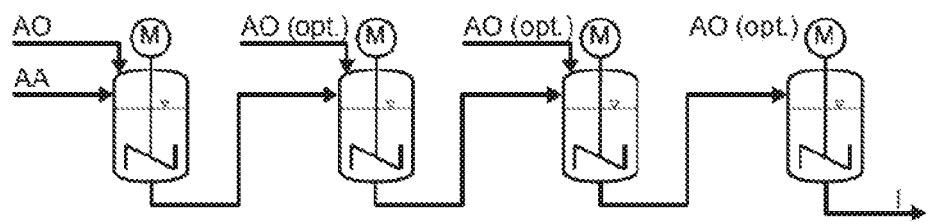
Figure 1:
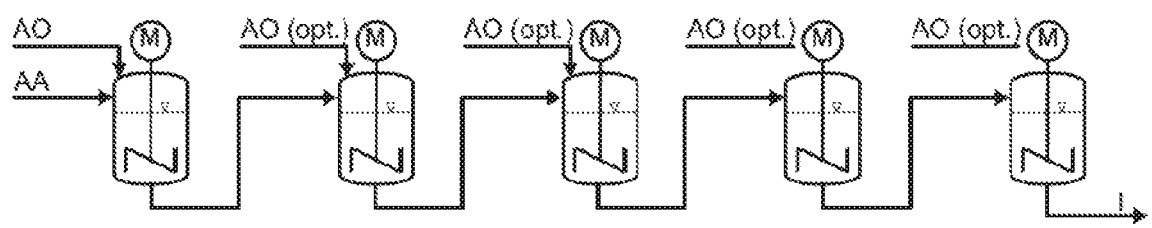
Figure 2:
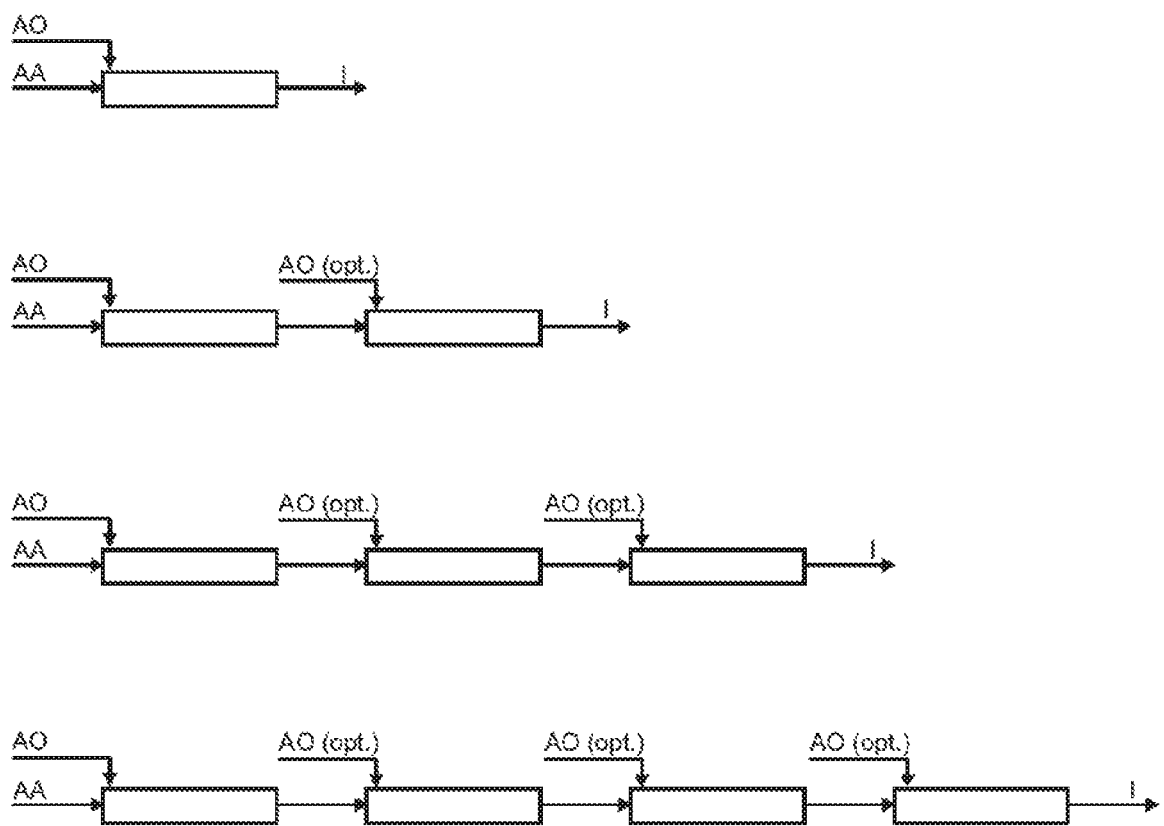
FIG. 2 illustrates certain embodiments of the present invention wherein at least one PFR, but no CSTRs are used for step (a) of the process according to claim 1.
Figure 3:
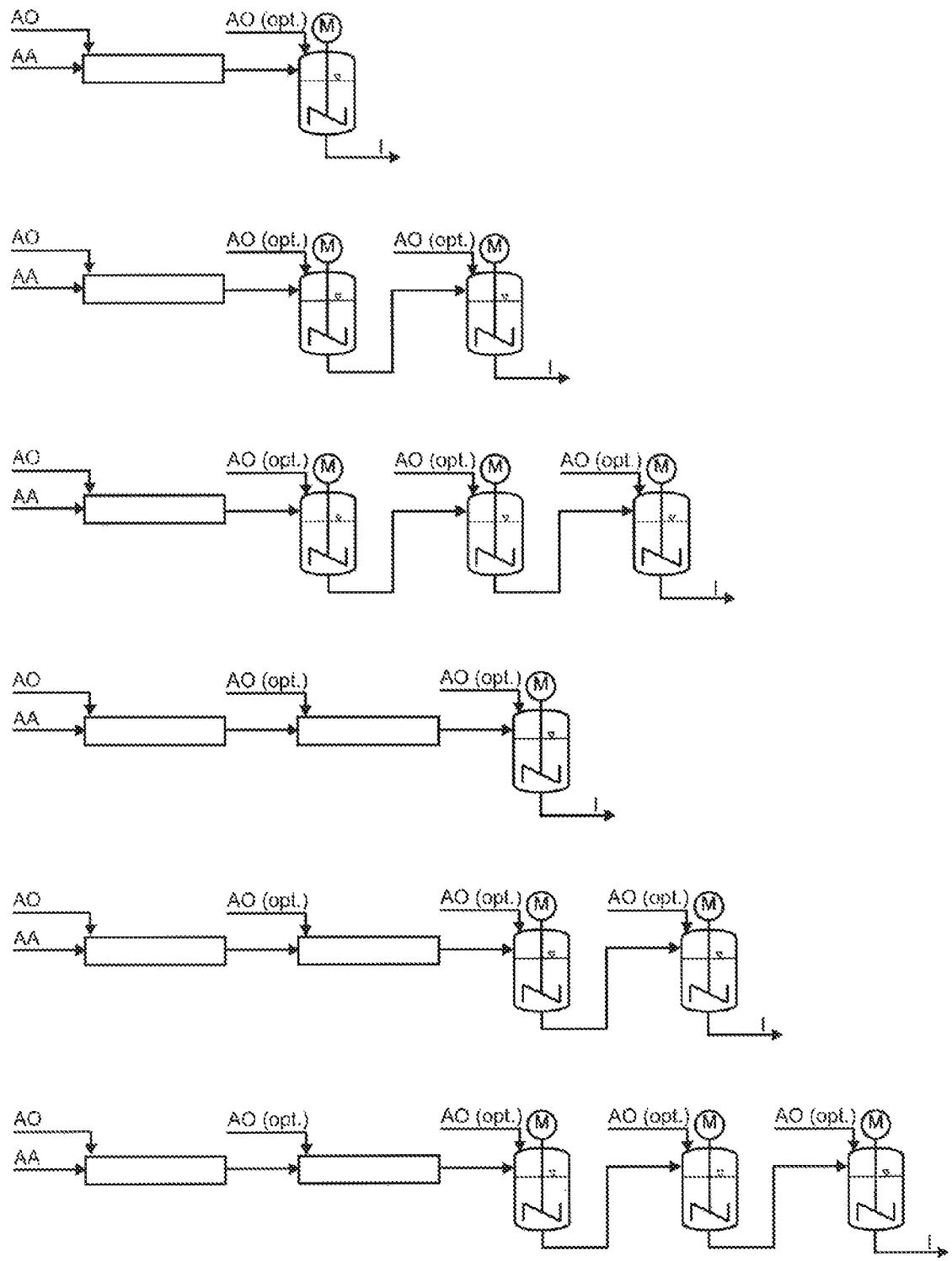
FIG. 3 illustrates certain embodiments of the present invention wherein a combination of PFRs and CSTRs are used for step (a) of the process according to claim 1.

The following examples illustrate some aspects of the present invention. They are not intended to limit the scope of the claims in any way.

In the following examples, the residual TDA content was measured as follows.

The content of TDA was determined by gas chromatography. An Agilent 7890 gas chromatograph equipped with a split/splitless injector and a flame ionization detector (FID) was used. The GC conditions are described below:
Column: DB17, 30 m×0.25 mm ID×0.25 μm film thickness
Carrier gas: helium
Flow: constant, 1.9 ml/min
Split flow: 73 ml/min
Injection volume: 1 μl
Inlet temperature: 250° C.
Detector temperature: 300° C.
Oven program: initial temperature: 75° C. (4 min hold)
  first ramp: 150° C. (2 min hold, rate: 10°/min)
  second ramp: 250° C. (30 min hold, rate: 10°/min)
A nine point external standard calibration was made for each TDA isomer (2,3-TDA,3,4-TDA,2,4-TDA and 2,6-TDA).

For each measurement 600 mg of standard solution or of sample were dissolved in 2 ml methanol.

The concentration of standard solutions was in the range of 5-1000 ppm per TDA isomer.

The amount of free PO in the reactor is determined by measuring the density of the reactive mixture with a Coriolis mass flow meter, calibrated with an unreactive solution; in addition, the concentration is measured by NIR (near infrared) measurements, calibrated with an unreactive solution.

1) COMPARATIVE EXAMPLE

Vicinal Toluenediamine (vTDA) was continuously pumped to a continuously stirred tank reactor (CSTR) at 140° C. with a residence time of 1.5 h. 2.7 mol Propylene Oxide (PO) per mol vTDA were added continuously to the reactor. Free PO in the CSTR was 4.9 wt %. The autocatalytic intermediate had a residual vTDA content of 6.5 wt %. The intermediate was pumped to a CSTR at 140° C. with a residence time of 6 h and a plug flow reactor (PFR) with a residence time of 2 h. Imidazole in watery solution as a catalyst and further 3.6 mol PO per mol vTDA were added to the CSTR. Free PO in the CSTR was 5.2 wt %. The final polyol had an OH value of 423 mgKOH/g and a residual vTDA content of 0.17 wt %.

2) COMPARATIVE EXAMPLE vTDA was continuously pumped to a CSTR at 150° C. with a residence time of 2.6 h. 2.7 mol PO per mol vTDA were added continuously to the reactor. Free PO in the CSTR was 3.5 wt %. The autocatalytic intermediate had a residual vTDA content of 6.8 wt %. The intermediate was pumped to a CSTR at 140° C. with a residence time of 6 h and a PFR with a residence time of 2 h. Imidazole in watery solution as a catalyst and further 3.6 mol PO per mol vTDA were added to the CSTR. Free PO in the CSTR was 4.5 wt %. The final polyol had an OH value of 427 mgKOH/g and a residual vTDA content of 0.23 wt %.

3) INVENTIVE EXAMPLE vTDA is continuously pumped to a plug flow reactor at 110° C. with a residence time of 1.3 h. 2.35 mol PO per mol vTDA are added continuously at 7 dosing points in such a way that free PO in the reactor never exceeds 15 wt %. Free PO at the exit of the PFR is not detectable. The autocatalytic intermediate has a free vTDA content of 1.5 wt %. The intermediate is pumped to a cascade of 2 CSTR at 130° C. with a residence time of 4 h and 2 h and a PFR with a residence time of 4 h. Imidazole in watery solution as a catalyst and further 3.6 mol PO per mol vTDA are added to the first CSTR. Free PO in the first CSTR is 10 wt % and in the second CSTR 6 wt %. The final polyol has an OH value of 416 mgKOH/g and a residual vTDA content of 0.08 wt %. It is thus below the limit of 1000 ppm.

4) INVENTIVE EXAMPLE vTDA is continuously pumped to a plug flow reactor at 130° C. with a residence time of 0.9 h. 2.55 mol PO per mol vTDA are added continuously at 5 dosing points in such a way that free PO in the reactor never exceeds 18 wt %. Free PO at the exit of the PFR is not detectable. The autocatalytic intermediate has a free vTDA content of 0.6 wt %. The intermediate is pumped to a cascade of 2 CSTR at 130° C. with a residence time of 4 h and 2 h and a PFR with a residence time of 4 h. Imidazole in watery solution as a catalyst and further 4 mol PO per mol vTDA are added to the first CSTR. Free PO in the first CSTR is 10 wt % and in the second CSTR 6 wt %. The final polyol has an OH value of 389 mgKOH/g and a residual vTDA content of 0.03 wt %. It is thus below the limit of 1000 ppm.

5) INVENTIVE EXAMPLE vTDA is continuously pumped to a plug flow reactor at 150° C. with a residence time of 1 h. 2.4 mol PO per mol vTDA are added continuously at 5 dosing points in such a way that free PO in the reactor never exceeds 15 wt %. Free PO at the exit of the PFR is not detectable. The autocatalytic intermediate has a free vTDA content of 1 wt %. The intermediate was pumped to a cascade of 2 CSTR at 130° C. with a residence time of 4 h and 2 h and a PFR with a residence time of 4 h. Imidazole in watery solution as a catalyst and further 3.9 mol PO per mol vTDA were added to the first CSTR. Free PO in the first CSTR was 9.5 wt % and in the second CSTR 5.5 wt %. The final polyol had an OH value of 410 mgKOH/g and a residual vTDA content of 0.04 wt %. It was thus below the limit of 1000 ppm.

6) INVENTIVE EXAMPLE vTDA is continuously pumped to a cascade of 3 CSTR at 140° C. with a residence time of 0.25 h each and a PFR with 0.3 h residence time. 2.7 mol PO per mol vTDA are added equally split between the three CSTR. Free PO in the reactor never exceeds 3 wt %. Free PO at the exit of the PFR is not detectable. The autocatalytic intermediate has a free vTDA content of 1 wt %. The intermediate is pumped to a cascade of 2 CSTR at 130° C. with a residence time of 4 h and 2 h and a PFR with a residence time of 4 h. Imidazole in watery solution as a catalyst and further 3.9 mol PO per mol vTDA are added to the first CSTR. Free PO in the first CSTR is 10 wt % and in the second CSTR 6 wt %. The final polyol has an OH value of 382 mgKOH/g and a residual vTDA content of 0.03 wt %. It is thus below the limit of 1000 ppm.

7) INVENTIVE EXAMPLE vTDA is continuously pumped to a cascade of 3 CSTR at 140° C. with a residence time of 0.25 h each and a PFR with 0.3 h residence time. 2.2 mol PO and 0.5 mol Ethylene Oxide (EO) per mol vTDA are added equally split between the three CSTR. Free Alkylene Oxide (AO) in the reactor never exceeds 2.5 wt %. Free AO at the exit of the PFR is not detectable. The autocatalytic intermediate has a free vTDA content of 0.9 wt %. The intermediate is pumped to a cascade of 2 CSTR at 130° C. with a residence time of 4 h and 2 h and a PFR with a residence time of 4 h. Imidazole in watery solution as a catalyst and further 3.3 mol PO per mol vTDA are added to the first CSTR. Free PO in the first CSTR is 8 wt % and in the second CSTR 4 wt %. The final polyol has an OH value of 427 mgKOH/g and a residual vTDA content of 0.04 wt %. It is thus below the limit of 1000 ppm.

The invention claimed is:

1. A process for continuous production of polyether alcohols, the process comprising:
   (a) continuously adding at least one aromatic amine (AA) at one dosing point D1 to an arrangement R1 comprising at least one plug-flow reactor (PFR) and/or a cascade of at least two continuously stirred tank reactors (CSTRs), and reacting with at least one alkylene oxide 1 (AO1) which is continuously dosed into the arrangement R1 at one or more dosing points D2 to generate an intermediate (I); and subsequently
   (b) continuously transferring the intermediate (I) into another arrangement R2 comprising at least one further reactor, and reacting with at least one alkylene oxide 2 (AO2) in the presence of at least one amine compound (AC), wherein at least one of the at least one amine compounds AC is selected from the group consisting of imidazoles, wherein the transferring (b) is initiated when the amount of free aromatic amine (AA) in the adding (a), as determined by gas chromatography, is less than 2% by weight, in relation to the total amount of the intermediate.

2. The process according to claim 1, wherein the arrangement R1 in the adding (a) consists of a cascade of two continuously stirred tank reactors (CSTRs).

\* \* \* \* \*